UNITED STATES PATENT OFFICE.

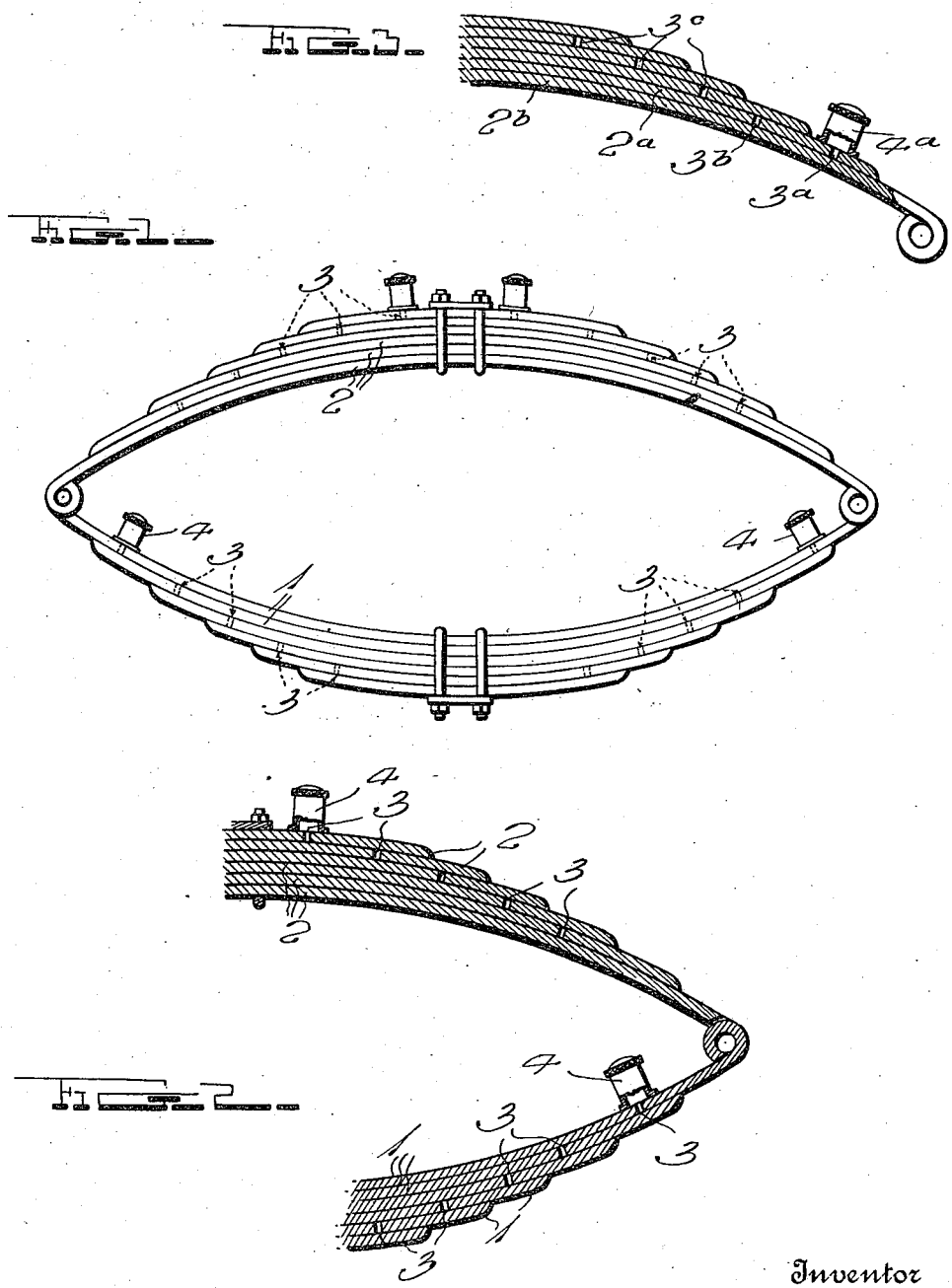

JAMES F. A. PHILLIPS, OF TRENTON, NEW JERSEY.

SPRING LUBRICATOR.

1,421,551.  Specification of Letters Patent.  Patented July 4, 1922.

Application filed September 29, 1921. Serial No. 504,029.

*To all whom it may concern:*

Be it known that I, JAMES F. A. PHILLIPS, a citizen of the United States, residing at Trenton, in the county of Mercer and State of New Jersey, have invented certain new and useful Improvements in Spring Lubricators; and I do declare the following to be a full, clear, and exact description of the invention, such as will enable others skilled in the art to which it appertains to make and use the same.

My invention relates to lubricating means for vehicle springs, in which the lubricating oil runs through a series of ports in the spring leaves, from an oil cup carried by one of said leaves, so as to cover the contacting surfaces of the leaves with an oil film. Numerous attempts have heretofore been made to properly lubricate the springs by an arrangement such as that suggested, but the constructions used have been such that the spring leaves have been materially weakened, both by the manner of attaching the oil cup and by the formation of grooves in the spring leaves to establish communication between the several ports or oil holes through the leaves. These groves have also been impractical on account of the expense of manufacturing especially constructed spring leaves or forming the grooves in springs of the usual construction. Another disadvantage is that when the several oil holes in the spring leaves are placed in communication by means of grooves, the oil seeks the course of least resistance and therefore runs through the oil holes and grooves, without spreading to the required extent over the leaves, so as to effectively lubricate them.

My invention aims to improve upon spring lubricating means of the character above discussed, first by providing a construction which will not noticeably weaken any of the spring leaves; and second by eliminating the grooves in the spring leaves so that the ports or oil holes through these spring leaves will be normally closed at both ends, the opening and closing action of the leaves during the operation of the spring, being relied upon to cause the flow of oil through the several holes and over the surfaces of the leaves. By these changes, not only do I produce a construction which will be as effectively lubricated as similar devices heretofore existing, but a simpler, less expensive arrangement is provided which may well be installed upon leaves of the type now in use, without the necessity of altering them in any manner, other than drilling small oil holes therethrough.

With the foregoing in view, the invention resides in the novel subject matter hereinafter described and claimed, the descriptive matter being supplemented by the accompanying drawings:

Figure 1 is a side elevation of a vehicle spring equipped with my invention.

Figure 2 is an enlarged sectional view through a portion of the spring.

Figure 3 is a sectional view showing a modified form of construction.

In the drawings, while I have illustrated my invention principally in connection with a full elliptic spring, it is to be understood that it may be used to equal advantage with springs of any type now commonly in use. The numerals 1 refer to the well known spring leaves forming the lower half of the spring, the upper or master leaf being pivoted in the well known way to the lowermost or master leaf of the leaves 2 forming the upper half of the spring. For purposes of understanding the invention, the lower half of the spring may well be considered as a semi-elliptic spring such as those commonly used on the front ends of automobiles, while either half of the upper portion of the spring may well be considered as either end of the well known cantilever spring, or part of a three quarter elliptic spring.

The several leaves 1 and 2, with the exception of the lowermost of these leaves, are provided with a series of spaced oil holes 3 which are drilled therethrough near their ends, it being preferable to only form one oil hole in each spring leaf, since this is ample for purposes of lubrication and will not materially weaken the leaves. The uppermost oil hole of each series comunicates with an oil cup 4 and a feature of novelty in my invention, consists in providing said oil cup with a flat discharge end which is soldered or otherwise secured against the uppermost spring leaf around its oil hole 3. This manner of securing the oil cup in place, does not necessitate forming a relatively large opening in the leaf and threading a stud or nipple on the oil cup into said opening, as heretofore attempted. In order to thread the oil cup into an opening of the spring, the opening must be made so large that the spring leaf is greatly weakened, this being of particular disadvantage in connection with the master leaf of any spring.

The oil cup 4 is adapted to supply oil to the several oil holes 3 so as to effectively lubricate the several spring leaves, but attention is here directed to the fact that said oil holes 3 are normally closed at both ends by the opposed flat sides of the adjacent leaves. Thus, when the car is standing idle, the oil cannot continually flow from the oil cup in the manner permitted in certain devices of the same general character as my invention, in which, however, the several oil holes are placed in communication by means of grooves formed in the spring leaves. As soon as the spring is brought into play, the usual opening and closing action of the spring leaves takes place, and I rely upon this action as well as capilarity to some extent, for the purpose of causing the necessary flow of oil from the cup 4 through the several oil holes 3.

It may here be stated that I have equipped one of the springs of my automobile with oil cups and drilled oil holes therethrough in accordance with the present invention and that the idea has been found to operate perfectly, furnishing a complete film of oil between the wearing surfaces of all adjacent spring leaves.

In Figure 3, I have shown a portion of a spring which may be of any well known type. In this spring, the leaf $2^a$ resting on the master leaf $2^b$, is formed with two oil holes $3^a$ and $3^b$ respectively, the former being in communication with an oil cup $4^a$ which is secured to the leaf $2^a$ in the same manner as the oil cups 4 are attached. The spring leaves above the leaf $2^a$ are formed with spaced oil holes $3^c$. In this form of construction, even though the oil holes $3^c$ at the inner end of the series, are at a higher level than the oil cup $4^a$, the pumping action caused by the continual opening and closing of the spring leaves, effectively draws the oil through the several holes to lubricate said leaves.

I wish to again lay particular stress on the following: Drilling of the oil holes 3, $3^a$, $3^b$ and $3^c$ through the spring leaves does not materially weaken said leaves; this operation can easily be performed in any shop, simply by dismantling the old spring; the contacting surfaces of the spring leaves are not provided with any grooves establishing communication between the several oil holes, and the ends of said holes are normally closed by the leaves; by attaching the oil cups 4 or $4^a$ in the manner set forth, instead of threading them into a relatively large opening in the spring leaf, this leaf is not weakened in the manner which it would be if a larger opening were formed therein; and these several distinctions not only produce a less expensive device than those which have heretofore been devised, but no efficiency has been sacrificed by the changes. In fact, a more efficient spring has been provided since it is lubricated to a degree equal if not excelling the prior devices, yet the spring is not weakened by the installation of my invention.

I claim:

A leaf spring comprising a plurality of leaves contacting with each other throughout their widths, said leaves having drilled therethrough a series of circular longitudinally spaced oil holes each of which extends from one flat side of a leaf to the other, and an oil cup for supplying oil to one of the endmost of the series of oil holes, said cup having a flat discharge end secured directly and integrally to the exposed flat side of one of the leaves around its oil hole to reinforce this leaf and overcome the necessity of weakening the leaf by drilling a relatively large hole therein for attaching the cup; the ends of all of said oil holes except the end communicating with said oil cup being entirely closed by the adjacent spring leaves, whereby the flow of oil is dependent upon the opening and closing action of the leaves during operation of the spring.

In testimony whereof I have hereunto set my hand.

JAMES F. A. PHILLIPS.